United States Patent [19]
Paulk et al.

[11] 3,747,267
[45] July 24, 1973

[54] CROP TYING MACHINE

[76] Inventors: John R. Paulk; Jacob W. Paulk, both of P. O. Box 567, Fitzgerald, Ga.

[22] Filed: Apr. 14, 1971

[21] Appl. No.: 133,857

[52] U.S. Cl.............................. 47/1, 56/10.2, 254/64
[51] Int. Cl............................................. A01g 17/08
[58] Field of Search........................... 47/1; 289/18; 254/64, 134.3, 134.5; 56/405, 426, 10.2

[56] References Cited
UNITED STATES PATENTS

| | | | |
|---|---|---|---|
| 759,401 | 5/1904 | Simmonds | 56/426 |
| 767,457 | 8/1904 | Webster | 56/426 |
| 1,553,706 | 9/1925 | Meink | 56/405 |
| 2,753,661 | 7/1956 | Wiemers | 47/1 |
| 3,015,187 | 1/1962 | Grether | 47/1 |
| 3,034,259 | 5/1962 | Herr | 47/1 |
| 3,201,085 | 8/1965 | Maley | 254/64 |

FOREIGN PATENTS OR APPLICATIONS

| | | | |
|---|---|---|---|
| 202,639 | 7/1967 | U.S.S.R. | 289/18 |
| 206,938 | 7/1967 | U.S.S.R. | 289/18 |

*Primary Examiner*—Robert E. Bagwill
*Attorney*—Sherman Levy

[57] ABSTRACT

A method and machine for tying crops whereby strings are wrapped around stakes and plants or crops in order to support the plants, crops and the like, and wherein there is provided a means on the machine for sensing the stake, regardless of the positioning of the stake and the needles, and wherein needles that carry the strings rotate in opposite directions relative to each other, and wherein there is a means for maintaining constant tension on the strings.

4 Claims, 6 Drawing Figures

PATENTED JUL 24 1973

INVENTOR
JOHN R. PAULK &
JACOB W. PAULK
BY Sherman Levy
ATTORNEY

CROP TYING MACHINE

This invention relates to a crop tying machine, and more particularly to a machine for tying strings to stakes so that crops, plants and the like can be properly supported in a desired manner.

An object of the present invention is to provide a crop tying machine wherein there is provided a means for sensing the stake regardless of the positioning of the stake, and wherein strings can be tied or wrapped around the stake and the plants or crops to support the crops and plants in a desired manner above the ground.

Another object of the present invention is to provide a crop tying machine which includes a means for maintaining a constant tension on the string, and wherein the present invention permits crops to be mechanically tied or supported by strings so that it is not necessary to tie the strings by hand and thus the present invention greatly reduces the amount of human effort that is ordinarily required in such jobs.

Still another object is to provide such a crop tying machine that is relatively economical to manufacture, and efficient in operation and which is rugged in structure, and generally fool-proof in use.

These and other objects of the invention will become apparent from a reading of the following specification and claims, together with the accompanying drawing, wherein like parts are referred to and indicated by like reference characters, and wherein:

FIG. 5 is a sectional view, taken on the line 5—5 of FIG. 2.

FIG. 6 is a sectional view, taken on the line 6—6 of FIG. 3.

Figure 1:
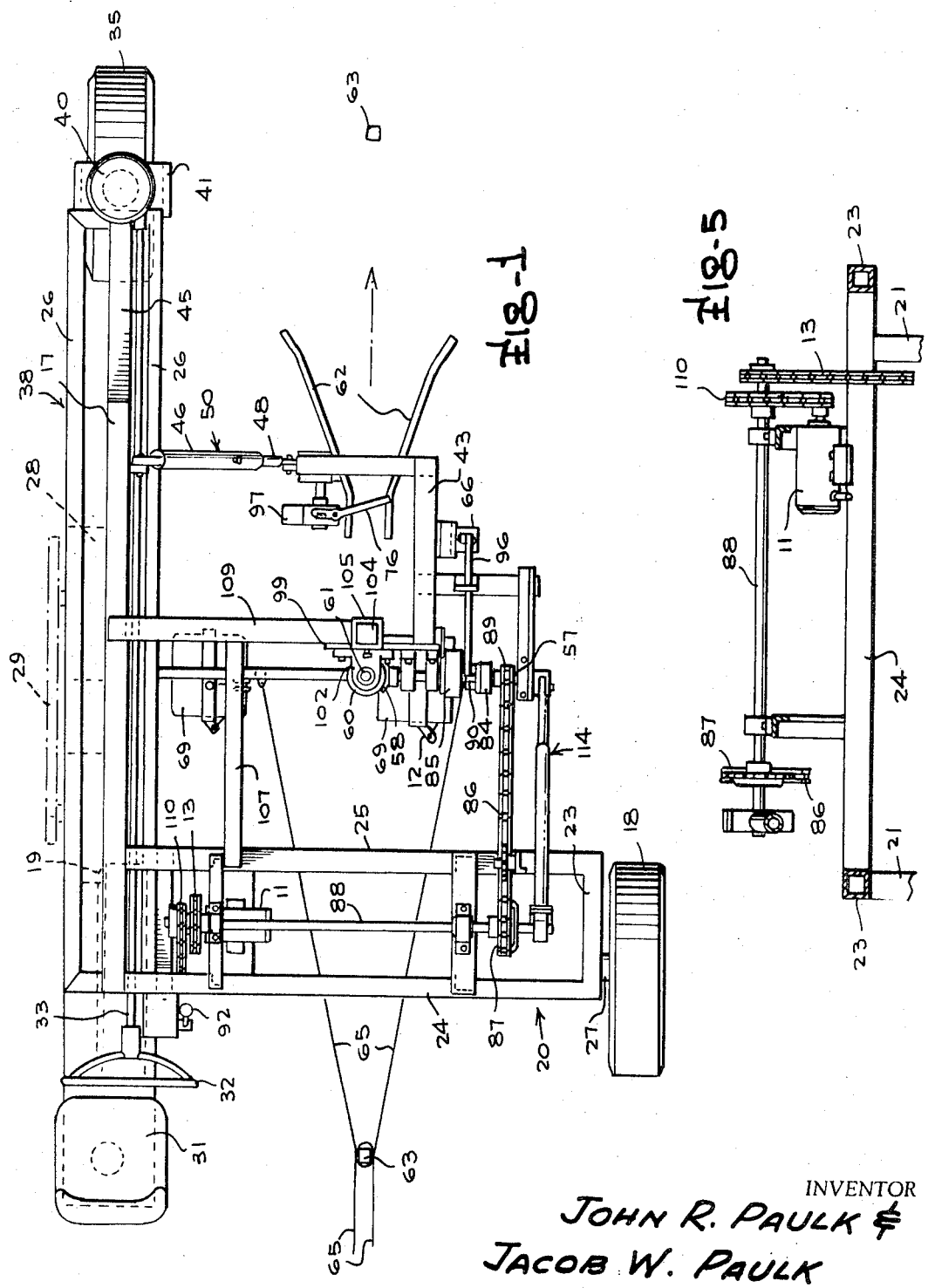
FIG. 1 is a top plan view of the crop tying machine of the present invention.

Referring in detail to the drawings, the numeral 20 indicates the crop tying machine of the present invention which may include a frame that is indicated generally by the numeral 38, and the frame 38 includes frame pieces or beams or bars 21 and 22. The frame 38 further includes horizontally disposed cross pieces 23 that extend between the upper ends of the beams 21 and 22, and is secured thereto or formed integral therewith, and the numerals 24 and 25 indicate horizontally disposed beams or cross pieces or frame members that are suitably secured to the member 23. The frame 38 further includes horizontally disposed beams 26 that have a conventional engine 27, such as a gasoline engine 27 suitably supported thereon. The numeral 28 indicates a conventional hydraulic pump that is driven by the engine 27 by means of an endless chain or belt drive 29 or the like. Hoses 30 are suitably connected to the hydraulic pump 28 for the passage therethrough of hydraulic fluid to a hydraulic motor 11 or the like, as later described in this application.

As shown in the drawings, the machine may be provided with a seat 31 for conveniently supporting the operator of the device, and a manually operable steering wheel 32 is arranged adjacent the seat 31. The numeral 33 indicates a steering rod or shaft that is suitably connected to the steering wheel 32, the front end of the steering rod 33 is operatively connected as at 40 to the upper end of a steering column 34, there being a front wheel 35 suitably mounted in a yoke 41 on the lower end of the column 34, FIG. 2.

A pair of rear wheels 18 and 19 are provided for the machine, and the wheels 18 and 19 are arranged in spaced apart relation with respect to each other, and the wheels 18 and 19 are suitably mounted on horizontally disposed axles 37. As shown in the drawings, the frame work further includes vertically disposed beams or posts 42 as well as horizontally disposed frame pieces 43 and 17, and the horizontal frame piece 17 has an inclined frame section or frame piece 45 connected thereto or formed integral therewith.

Figure 3:
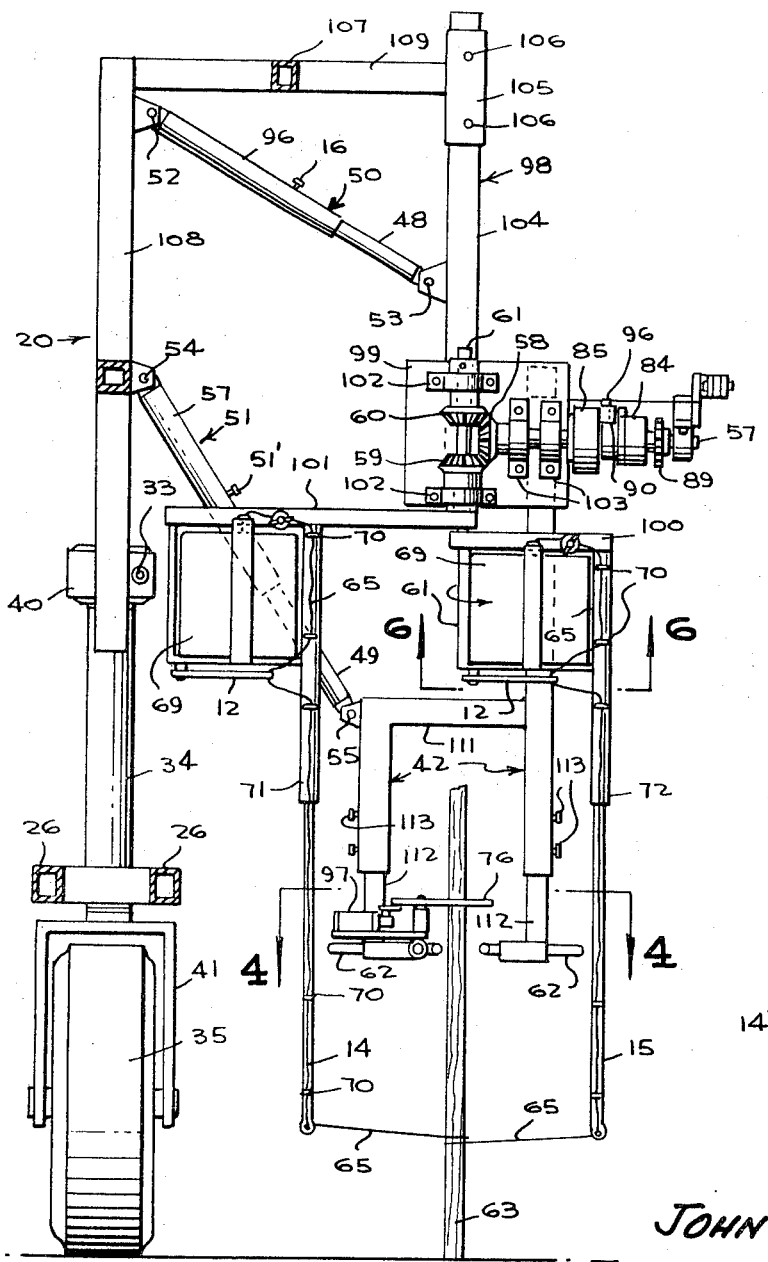
FIG. 3 is a sectional view, taken on the line 3—3 of FIG. 2.

The numerals 50 and 51 indicate support brace assemblies, FIG. 3, and the support brace assembly 50 includes a cylinder or hollow member 46 that has a rod or arm 48 telescopically or adjustably mounted therein, and the ends of the assembly 46 are connected as at 52 and 53 to adjacent portions of the frame work. The numeral 16 indicates a set screw or securing element that is provided for maintaining the parts 48 and 46 stationary in their adjusted position. The support brace assembly 51 includes a tubular member or hollow member 57 that has a rod or arm 49 telescopically or adjustably mounted therein and the ends of the brace assembly 47 are connected at at 54 and 55 to the adjacent portions of the frame work. A set screw 51' is provided for maintaining the members 49 and 57 stationary in their adjusted position.

As shown in the drawings, there is provided a drive shaft 57 that has a bevel gear 58 therein, and the bevel gear 58 meshes with a pair of bevel gears 59 and 60 that are mounted on a driven shaft 61, FIG. 3. The bevel gear 60 is fixedly secured to a vertically disposed shaft 61 that extends through the hollow bevel gear 59.

Figure 4:
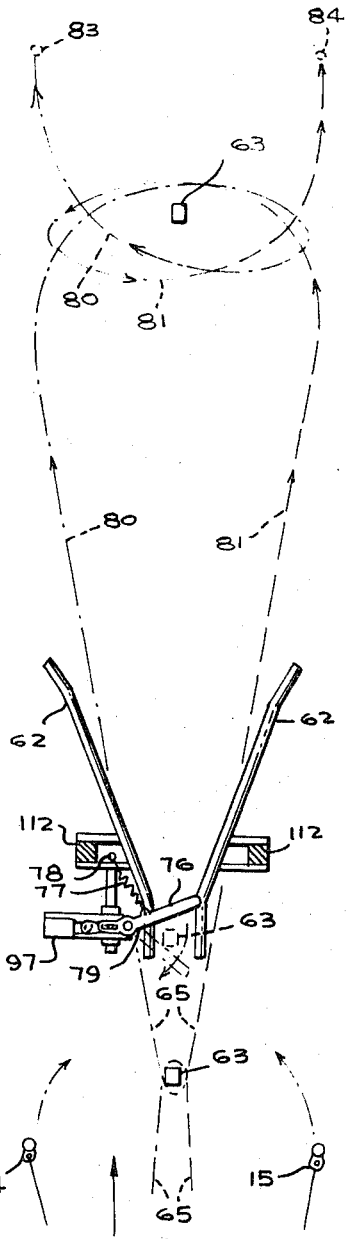
FIG. 4 is a sectional view, taken on the line 4—4 of FIG. 3.

As shown in FIG. 4 there is provided a pair of guide elements 62, for the machine. The numeral 63 indicates stakes that are adapted to have twine or string or cord 65 wrapped therearound in order to tie the crops or plants to the stakes 63 as the machine 20 moves in a forward direction. The numerals 14 and 15 indicate needle arms which are actuated as later described in this application. The numeral 66 indicates a solenoid that is arranged as shown in the drawings.

A pair of boxes or housings 69 are suitably supported on the frame 38 whereby a quantity of string or cord or twine 65 can be arranged therein. The twine 65 may be guided through eyelets 70 along a pair of vertically disposed arms 71 and 72 which have needle portions 14 and 15 on their lower ends.

As shown in FIG. 4, a pivotally mounted stake feeler member 76 is adapted to be engaged by a vertically disposed stake 63, and the element or member 76 is urged or biased in the proper direction by means of a spring member 77. One end of the spring member 77 may be anchored as at 78, and the other end of the spring member 77 is connected to the element 76 as at 79. In FIG. 4, numerals 80 and 81 indicate the path of movement of the strings or twine which will be looped or be wrapped around the plant and the stake 63 to subsequently end up in a position such as positions 83 and 84.

The bevel gear 59 turns the needle 14 on the left, and the bevel gear 60 turns the needle 15 on the right.

As shown in FIG. 3, a clutch 84 is mounted on the shaft 57 and a brake unit 85 is also mounted on the shaft 57.

Figure 2:
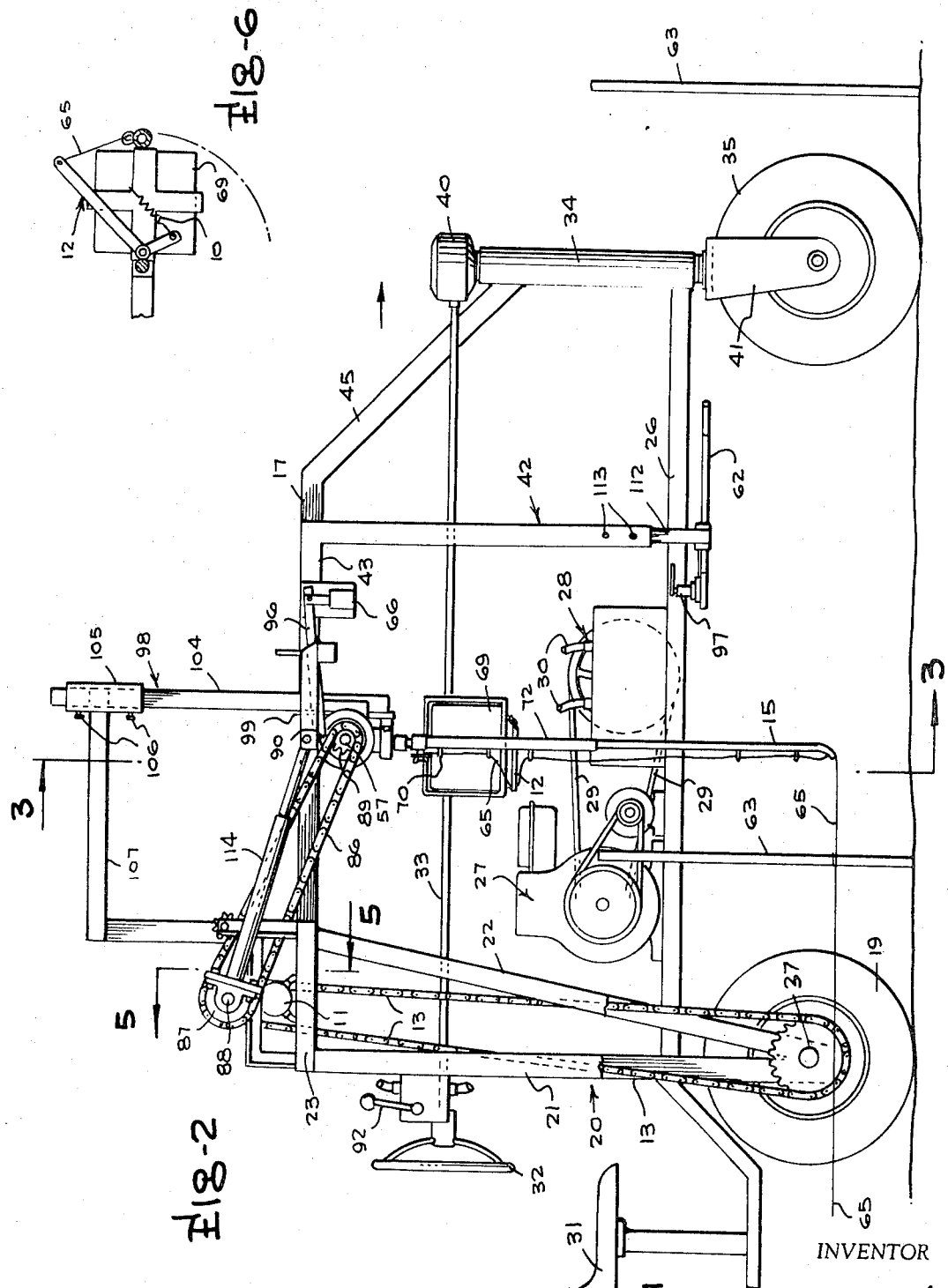
FIG. 2 is a side elevational view thereof, with parts broken away for clarity of illustration.

Referring to FIG. 2 of the drawings, the numeral 86 indicates an inclined chain drive which engages a sprocket 87 on a shaft 88, and the chain 86 also engages a sprocket 89 on the shaft 57. A dog 90 is associated with the clutch. A chain 13 drives one rear wheel 19 and the other rear wheel turns as the power is transmitted to the wheel 19 in order to move the machine 20 in a forward direction or from left to right, as in FIGS. 1 and 2.

The hydraulic pump 28 may be mounted in a reservoir of a conventional construction. The numeral 92 indicates a hydraulic valve control for forward or reverse direction or travel. The numeral 87 indicates a torque limiting sprocket to protect the thread needles if they collide with a stake such as the stake 63. The clutch 84 is a single revolution clutch to cycle the needles 14 and 15. The numeral 85 indicates a brake band with constant tension to stop the needles 14 and 15 smoothly when the clutch 84 is disengaged. The solenoid 66 is provided for selectively actuating the clutch 84. The top gear shaft 61 goes through the hollow botton gear 59, and this arrangement causes the needle carriers or arms 71 and 72 to rotate in opposite directions relative to each other. Numeral 96 indicates a clutch cam stop or lever. The solenoid 66 selectively pulls the lever 96 and actuates clutch 84, and as the clutch rotates one revolution, the lever 96 strikes a cam or dog 90 on the clutch 84 to stop the same.

The numeral 76 indicates a stake feeler, and as the machine 20 approaches the stake such as the stake 63, the feeler 76 is forced to the rear or is forced from the solid line position of FIG. 4 to the broken line position of FIG. 4, so as to operate the micro switch 97. The micro switch 97, when closed, actuates the solenoid 66. Suitable electric wires may be provided for the electrical circuit.

The numeral 98 indicates a mounting bracket assembly whose parts can be adjusted up and down for accommodating stakes of different heights and in addition, this assembly 98 is also adjustable back and forth to accommodate the machine to different widths of rows.

A spring tensioner 12 is provided and this has an adjustable spring arrangement to control the tension of the string.

The needles 14 and 15 are adjustable for the height of string on the stake and these needles make a complete revolution around each stake 63 as the machine reaches each stake. The numeral 62 indicates the stake guides. Containers 69 are provided for carrying extra balls of twine. The assembly 12 maintains tension on the string.

The numeral 99 indicates a vertically disposed mounting plate which has bearings such as the bearings 102 and 103 suitably affixed thereto whereby the right angularly arranged shafts 61 and 57 can be rotatably supported therein. The numeral 100 indicates a crank which is affixed to the vertical shaft 61, and the crank 100 is secured to or formed integral with the upper end of the arm 72. Likewise, there is provided a crank or bar 101 that is affixed to the lower bevel gear 59, and the crank 101 is affixed to the upper end of the needle arm 71. This construction or provision of the arms 101 and 100 serves to assure that the arms 71 and 72 can rotate or revolve in the proper manner relative to each other.

The supporting plate 99 is suitably affixed to the lower end of a vertical post or beam 104 that forms part of the support assembly 98, and the beam 104 is adjustably received in a hollow member 105, and suitable securing elements 106 are provided for maintaining the member 104 stationary in its various adjusted positions. The support assembly 98 may further include portions or beams or bars such as the bars 107, 108 and 109, FIG. 3.

The numeral 110 indicates a chain and sprocket drive between the shaft 88 and the hydraulic motor 11.

The posts or frame pieces 42 have bars 112 depending therefrom, FIG. 3, and the bars 112 have the guide elements 62 suitably affixed thereto. Securing elements such as set screws, bolts or the like, 113 are connected to the members 42 so that by loosening the elements 113, the bars 112 can be raised or lowered, and then after these parts have been moved to their desired position, the elements 113 can be tightened to maintain the parts stationary in their adjusted position. This construction permits the parts such as the stake guide element 62 to be positioned at different elevations as desired or required.

The parts can be made of any suitable material and in different shapes and sizes, as desired or required. While a particular frame or supporting structure has been illustrated for the present invention, it is to be understood that different types of supports or frames can be used, as desired or required, and the present invention is primarily directed to the aspects or features of the crop tying mechanism.

In use, with the parts arranged as shown in the drawings, an operator is adapted to sit on the seat 31, and with the engine 27 operating, it will be seen that power will be transmitted to the hydraulic pump 28 through a drive of a suitable construction such as the drive 29. Hydraulic fluid is adapted to be pumped from the adjacent reservoir by pump 28 to actuate or operate the hydraulic motor 11, and the motor 11 drives the shaft 88 through a drive mechanism such as the chain drive 110. The valve control 92 can be used for controlling operation of the hydraulic parts. With the shaft 88 rotating, it will be seen that the chain 86 will be driven due to the provision of the sprocket 87 on the shaft 88, and this movement of the chain 86 will cause corresponding rotation of the shaft 57, since the chain 86 also engages the sprocket 89 on the shaft 57. As the shaft 57 rotates, it rotates the bevel gear 58, and, as previously stated, the bevel gear 58 is arranged in meshing engagement with the lower and upper bevel gears 59 and 60. The bevel gear 60 is fixedly mounted on the vertical shaft 61, and the bevel gear 59 is loosely mounted on the shaft 61. Thus, as the upper bevel gear 60 rotates or turns, it will rotate the shaft 61, and since the crank 100 is affixed to the shaft 61 and because the crank 100 is connected to the upper end of the needle arm 72, the arm 72 will be rotated in one direction. Similarly, the crank 101 is affixed to the lower bevel gear 59, so that as the bevel gear 59 turns, the crank 101 will be turned and because the crank 101 is affixed to the upper end of the arm 71, it will be seen that the arm 71 will be rotated or turned and the pair of needle arms 71 and 72 rotate in opposite directions relative to each other.

The pair of arms 71 and 72 carry the needles 14 and 15 therewith, and the twine or string 65 is trained down along the needles so that the string will be wrapped around the stake 73 and crops or plants to be supported.

Furthermore, it will be noted that there is provided the pair of spaced apart guide members 62 which receive the stakes 63 therebetween as the machine 20 moves forwardly, and when a stake 63 engages or reaches the feeler element 76, the feeler element 76 will be pivoted to actuate the micro switch 97, and because the micro switch 97 is electrically connected to the solenoid 66, it will be seen that this will result in actuation of the solenoid 66 and thereby pivot or move the lever 96 that coacts with the cam stop or dog 90 on the shaft 57, whereby the desired action can take place.

The entire machine 20 is adapted to be driven by a suitable mechanism, as for example by means of a chain drive 13 which serves to operatively connect the shaft 88 to an axle 37 for a rear wheel 19.

The various parts are adjustable. For example, the guide element 62 can be raised or lowered as desired due to the provision of the beams or bars 112 to which they are connected, and the beams 112 are adjustably connected to the posts 42 and are held in their adjusted position by means of the securing elements 113. A brace assembly 114 may be provided and arranged as shown in the drawings. Other braces can be used wherever needed or desired. Likewise, the mounting assembly 98 has an adjustable construction, and, for example, by loosening the securing elements 106, the bar 104 can be raised or lowered to vertically adjust the parts to the desired elevation, and similarly, a means is provided for permiting horizontal adjustment of the parts.

It will, therefore, be seen that there has been provided a crop tying machine which will permit crops to be tied mechanically instead of by hand, so that the present invention is adapted to be used for crops that are to be supported by strings. At the present time, this job is being done manually, and it takes a great deal of human effort to accomplish the same, and the present invention can do the work of approximately 12 men per day tying by hand. The main frame 38 may be constructed of a suitable material such as square tubing. The engine 27 may be an 8-horse power gasoline engine, and the hydraulic pump 28 can be mounted in a reservoir. The numeral 11 indicates a hydraulic motor of conventional construction, and the hand actuated hydraulic valve 92 is provided for forward or reverse direction of travel of the machine. The torque limiting sprocket 87 serves to protect the thread needles 14 and 15 if they collide with a stake 63. The clutch 84 is a single revolution clutch for cycling the needles. The brake band 85 has constant tension to stop the needles smoothly when the clutch 84 is disengaged. The solenoid 66 serves to actuate the clutch 84. The bevel gears 60 and 59 are arranged so that the top gear shaft 61 passes through the bottom gear 59, and this construction causes the needle carriers or arms 71 and 72 to rotate in opposite directions relative to each other. The clutch cam stop 90 is arranged so that the solenoid 66 selectively pulls the lever 96 and actuates the clutch. As the clutch 84 rotates one revolution, the lever 96 strikes a cam or dog 90 on the clutch 84 to stop the same.

With further reference to the stake feeler 76, as the machine approaches a stake, the feeler 76 is forced to the rear and operates the micro switch 97. The micro switch, when closed, actuates the solenoid 66. The mounting bracket 98 is adjustable up and down for stakes of different height, and is also adjustable back and forth for different widths of rows.

A string tensioner 12 is arranged below each string box 69, and the spring 10 is adjustable to control the tension of the string 65.

The needles 14 and 15 are adjustable for the height of string on the stake, and these needles 14 and 15 make a complete revolution around each stake as the machine reaches each stake, as illustrated in FIG. 4 of the drawings. The numeral 62 indicates the stake guides. There is also provided the string containers or boxes 69 for carrying extra balls of twine. Levers are provided for maintaining tension on the string 65.

It will be seen, therefore, that with the parts arranged as shown in the drawings, the machine 20 is adapted to travel at a suitable speed, such as about 1 mile per hour down a row. As a stake 63 is approached, the stake feeler 76 is forced to the rear and closes the points in the micro switch 97. This permits electric current to actuate the solenoid 66. The solenoid 66 pulls the cam stop lever 96 down and actuates the single revolution clutch 84, which causes the needles 14 and 15 to pass just in front of a stake so as to assure that the crop will not be damaged. As the machine moves forward, the needles 14 and 15 complete their revolution and just pass the stake in the rear, and this is illustrated schematically in FIG. 4.

Stop lever 96 strikes the cam 90 at the end of one revolution and stops the needles 14 and 15 from rotating and the machine is now ready for the next stake to come to the machine. It is to be noted that the first string 65 is tied to the stakes 63 when the crop is about one foot in height. The string will sandwich the plants between them to make the crops stand up. As the crop grows about another foot taller, it is tied a second time with the needles adjusted so as to catch the top of the crop and stand it up straight again. A third string or other additional strings may be tied as required as the plants continue to grow.

Some of the important aspects or features of the present invention are as follows: There is provided a means for sensing the stakes, no matter what the stake spacing is. Also the needles, by rotating opposite to each other, can tie the string or wrap the string around the stake at the same time and open back up to permit the string to be placed on the outside of the crop. The stakes can have an irregular spacing and the machine will still work efficiently. The tension of the string can be adjusted or controlled as desired.

Another important aspect or feature of the present invention is the lever, such as the lever 12 for maintaining constant tension on the string. There is a point in the rotating of the needles that the needles travel faster to the rear of the machine and the string will go slack. This lever 12 is spring loaded as at 10, and is under tension while the string is being dispensed. Thus, as the slack starts to come in the string, the lever is pulled by the spring to take up the slack.

When the end of the row is reached, the machine is stopped. The string is then cut with a knife and tied to the stake, and the ends at the needles are tied together.

When the machine is started down a new row with the ends tied together, it wraps around the first stake and the cycle is continued, and this, therefore, relieves the operator from tying the string at the start of each row.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A crop tying machine comprising a frame including horizontally disposed beams, an engine mounted on said beams, a hydraulic pump driven by said engine, a hydraulic motor mounted on the frame and operatively connected to the pump, front and rear wheels for the frame, steering means for the machine, means for driving a rear wheel to move the machine, a horizontally disposed driven shaft supported by said frame, a drive shaft operated by said hydraulic motor, means including said drive and driven shafts together, a clutch and brake unit and cam stop connected to said driven shaft, a bevel gear connected to said driven shaft, a solenoid supported by said frame, a lever actuated by said solenoid for coaction with the cam stop on the driven shaft, a vertically disposed shaft member having upper and lower bevel gear members associated therewith for meshing with the bevel gear on the driven shaft, a pair of vertically disposed rotary carrier arms supported by said frame, cranks connecting said vertically disposed shaft member and said lower bevel gear member to a respective one of said arms, vertically disposed needles carried by said arms, containers on said frame for holding string, spring biased string tensioners adjacent said containers, an adjustable support assembly including vertically disposed members having pairs of guide elements connected thereto, a pivotally mounted stake feeler element adjacent each pair of guide elements, a micro switch actuated by the stake feeler element, and said micro switch seving to selectively actuate the solenoid.

2. In combination with a self-propelled machine for tying crops comprising a frame including horizontally disposed beams, an engine mounted on said beams, a hydraulic pump driven by said engine, a hydraulic motor mounted on the frame and operatively connected to the pump, front and rear wheels for the frame, steering means for the machine, means for driving a rear wheel to move the machine, a horizontally disposed shaft supported by said frame, a drive shaft operated by said hydraulic motor means operatively connecting said drive and driven shafts together, a clutch and brake unit and cam stop connected to said driven shaft, a bevel gear connection to said driven shaft, a solenoid supported by said frame, a lever actuated by said solenoid for coaction with the cam stop on the driven shaft, a vertically disposed shaft member having upper and lower bevel gear members associated therewith for meshing with the bevel gear on the driven shaft, a pair of vertically disposed rotary carrier arms supported by said frame, cranks connecting said vertically disposed shaft member and said lower bevel gear member to said creaks, vertically disposed needles carried by said arms, containers on said frame for holding strings; spring biased tensioners adjacent said containers, an adjustable support assembly including vertically disposed members having pairs of guide elements connected thereto, a pivotally mounted stake feeler element adjacent each pair of guide elements, a micro switch actuated by the stake feeler element, and said micro switch serving to selectively actuate the solenoid.

3. A crop tying machine comprising a mobile frame, string supply means mounted on said frame, a pair of laterally disposed rotatable needle members mounted on said frame stake, guide elements mounted on said frame in advance of said needle members and being adapted for receiving stakes therebetween as said frame moves forwardly, stake feeler means mounted on said frame and so located with respect to said guide elements that it is adapted to sense the presence of a stake passing therebetween, and means operatively connected between said feeler means and said needle member, for rotating said needle members following the sensing of a stake by said feeler means, whereby string carried by said needle members is looped about said stake, drawing crop limbs against said stake.

4. The structure as defined in claim 3, wherein said needle rotating means comprises a micro switch actuated by said stake feeler means, a solenoid selectively energized by said micro switch, and means actuated by said solenoid for controlling rotation of said needles.

* * * * *